United States Patent [19]

Broomfield

[11] Patent Number: 4,857,277

[45] Date of Patent: Aug. 15, 1989

[54] OZONE GENERATING DEVICE

[75] Inventor: Paul A. Broomfield, Holland Patent, N.Y.

[73] Assignee: Broomfield, U.S.A., Inc., Holland Patent, N.Y.

[21] Appl. No.: 117,996

[22] Filed: Nov. 9, 1987

[51] Int. Cl.[4] .............................................. C01B 13/11
[52] U.S. Cl. .......................... 422/186.07; 422/186.3; 422/186.18
[58] Field of Search ...................... 422/186.07, 186.15, 422/186.16, 186.3, 186.18, 186.12, 907; 204/176

[56] References Cited

U.S. PATENT DOCUMENTS

| | | | |
|---|---|---|---|
| 1,971,513 | 8/1934 | Stoddard | 422/186.15 |
| 2,658,868 | 11/1953 | Collison | 422/186.15 |
| 3,421,999 | 1/1969 | Corwin | 422/186.15 |
| 3,745,750 | 7/1973 | Arff | 422/186.15 |
| 3,752,748 | 8/1973 | McMillan, Jr. | 422/186.15 |
| 3,844,741 | 10/1974 | Dimitrik | 422/186.3 |
| 4,016,060 | 4/1977 | Lowther | 204/176 |
| 4,035,657 | 7/1977 | Carlson | 422/186.1 |
| 4,138,724 | 2/1979 | Kawauchi | 204/176 |
| 4,450,139 | 5/1984 | Bussiere et al. | 422/186.3 |
| 4,504,445 | 3/1985 | Walz | 422/186.07 |
| 4,682,266 | 7/1987 | Huynh et al. | 422/186.16 |
| 4,694,179 | 9/1987 | Lew et al. | 422/186.3 |
| 4,694,376 | 9/1987 | Gesslauer | 422/186.16 |

Primary Examiner—John F. Terapane
Assistant Examiner—Susan Wolffe
Attorney, Agent, or Firm—Wall and Roehrig

[57] ABSTRACT

An ultraviolet ozone generating device has a tubular enclosure with a light tunnel or box situated within the enclosure and containing a cold cathode UV lamp. An input duct and an output duct, each comprised of a 90 degree ell tube, prevent direct line of sight escape of the UV radiation from the device but do not restrict the air flow through the light tunnel. In order to control the output level, the lamp is powered to pulse on and off, and the duty cycle of the lamp power is controlled through a control knob which can be adjusted as desired. The enclosure is constructed so that any condensation forms and drips to the outside.

5 Claims, 1 Drawing Sheet

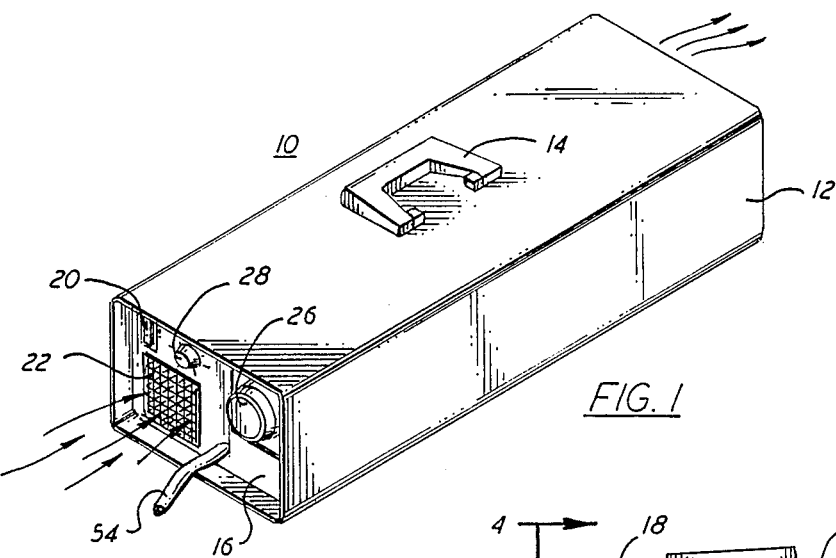
FIG. 1
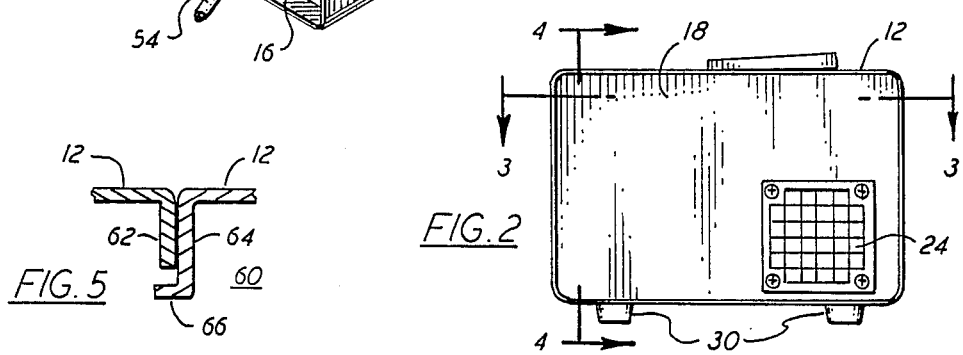
FIG. 5
FIG. 2
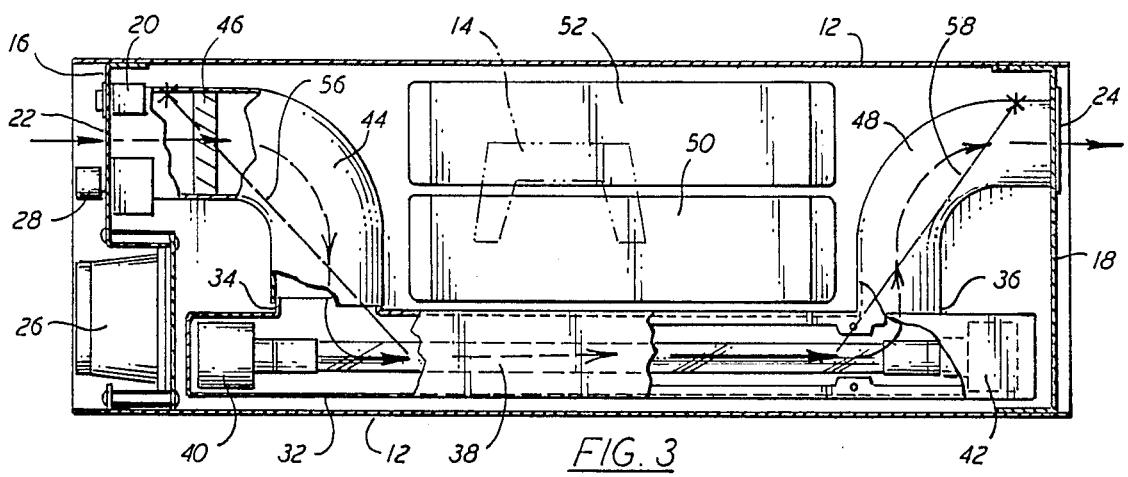
FIG. 3
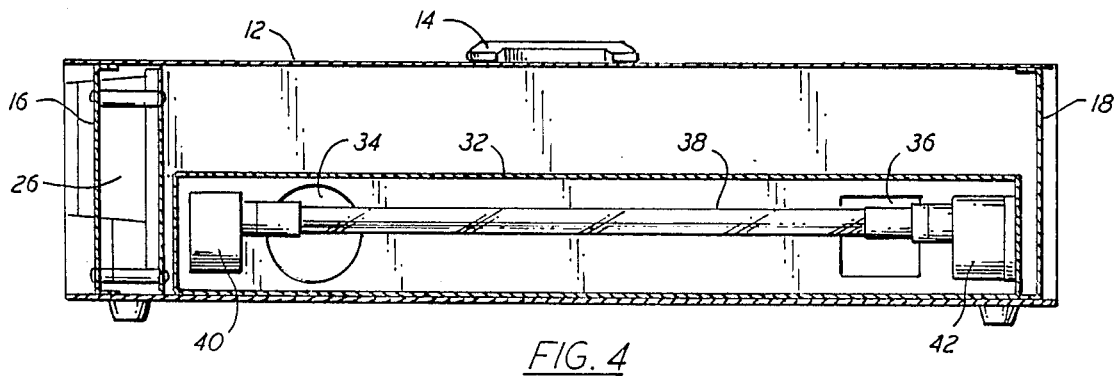
FIG. 4

OZONE GENERATING DEVICE

BACKGROUND OF THE INVENTION

This invention relates to the generation of ozone, and is particularly directed to devices that emit ultraviolet light to convert atmospheric oxygen to ozone in air that flows therethrough.

Ozone is used in the home or workplace because of its ability to react with many noxious or objectionable vapors and remove them from the environment. Ozone is also poisonous to many types of fungus, yeast and bacteria, and can be used to control decay causing organisms in food substances and the like. Ideally, the ozone should be produced in small quantities to enrich the atmosphere with this gas. Ozone is a tertiary oxygen molecule, and is highly unstable. It exists only for a matter of minutes before decaying back to the stable binary state. Thus, it must be produced continuously when and where needed to be effective.

The most convenient and safest means to produce ozone is with ultraviolet radiation. Ultraviolet light, usually from a discharge tube, has a wavelength selected such that its photon energy corresponds to the energy needed to change normal binary oxygen $O_2$ to ozone $O_3$.

Unfortunately, the ultraviolet wavelengths used for ozone production are also dangerous to humans and animals, and can cause skin or eye damage. This light, being invisible, gives no warning to humans in the vicinity. For this reason, ultraviolet or UV ozone generators are usually provided with shields and baffles to prevent the radiation from leaking out of the machine. However, these structures also tend to obstruct air flow and reduce the efficiency of the machine.

Where ozone is desired to control food decay bacteria or fungus in a cold locker, cooler, or other food storage compartment, an ultraviolet source is usually provided with baffling which may prevent danger to humans. However, little or no thought is given to preventing the radiation from falling on meat or vegetables. Consequently, damage to the quality of the food can occur resulting in degradation in color and taste.

The control over ozone output of a conventional UV device is exercised by masking off a portion of the UV lamp or generating table using either a sleeve or a shield member over the lamp or tube. With this structure, adjustment is cumbersome and time consuming, and in effect denies the user any real control over the output.

OBJECTS AND SUMMARY OF THE INVENTION

Accordingly, it is an object of this invention to provide a UV ozone generator device which avoids the drawbacks of the prior art.

It is a more particular object of this invention to provide an ozone generator which has an air path that permits adequate flow of air past the UV generating tube, and yet obstructs any line of sight from the interior to outside the device.

It is another object of this invention to provide an ozone generator device which permits the ozone production rate to be controlled with electrical means, and where control can be exercised by a simple manual adjustment on the outside of the device.

Another object is to provide an ozone generator device that is efficient and reliable, that can be preset for intermittent operation when needed, and that is resistant to effects of moisture or contaminants in the environment.

According to an aspect of the invention, the ozone generating device has an enclosure, with an input duct conducting air into it and an output duct conducting ozone-enriched output air from the enclosure. A tubular tunnel or light box within the enclosure has an input end to which the input duct is connected and an output end to which the output duct is connected. An ultraviolet lamp in the tunnel produces radiation at a wavelength suitable for the production of ozone from oxygen in the air passing through the tunnel. The input and output ducts each comprise a ninety degree arcuate bend constructed so that there is no direct line of sight from the light tunnel to either open end. The ducts are painted or coated with a black material, i.e., non-reflecting as to the ultraviolet radiation in question. A 24-hour programmable timer gives the user the capability of unattended operation by permitting the user to preset start and stop times for the device. To control the output of ozone, the power to the UV generating tube is provided, from a power circuit, as pulses of power. The duty cycle of the power is controllable by a duty cycle timer that is independent of the 24-hour programmable timer. By adjusting a knob on an external panel of the device, the user can adjust and set the percentage of time that the generating tube is on. The pulsing on and off of the generating tube at a rate of several times per second to once every several seconds directly relates to the ozone output level. The lamp can be a cold cathode generating tube which permits the device to be cycled on and off continually without compromising long bulb life.

To render the device fairly free from moisture or other environmental contaminants, the outer enclosure is formed of sheet stainless steel and incorporates drip edges where the panels join. This induces any condensation to form and drip harmlessly to the outside.

The above and many other objects, features and advantages of this invention will be more fully understood from the ensuing description of a preferred embodiment, which is given as an example with reference to the accompanying drawing.

BRIEF DESCRIPTION OF THE DRAWING

FIG. 1 is a perspective view of an ozone generator according to one preferred embodiment of this invention.

FIG. 2 is an end elevation of the output end of the preferred embodiment.

FIG. 3 is a top sectional plan of the preferred embodiment, taken at 3—3 of FIG. 2

FIG. 4 is a sectional elevation taken at 4—4 of FIG. 2.

FIG. 5 is a detail view of a portion of the enclosure of the preferred embodiment.

DETAILED DESCRIPTION OF THE PREFERRED EMBODIMENT

With reference to the drawing, and initially to FIG. 1 thereof, a UV ozone generator device 10 comprises an elongated enclosure 12 which includes a sheet of stainless steel formed into a generally rectangular tube, with a carrying handle 14 mounted on the center of the top of the enclosure 12. An input side panel 16 fits in one end of the tubular enclosure 12 and an output side panel 18, as shown in FIG. 2, fits in the opposite end thereof.

On the input side end panel 16, there is an on-off switch 20, with incorporated pilot light or LED, and an input opening grid or fan guard 22. A similar output opening grid 24 is disposed in the output-side end panel 18. These grids 22 and 24 are preferably formed of a black phenolic resin or similar plastic material, and in addition to keeping stray material out of the device, these grids also absorb stray UV radiation which may reach them.

Also on the panel 16 is a 24-hour programmable timer 26, which is disposed in series with the on-off switch 20. This timer 26 permits the unit to be switched on and off automatically at predesignated times for unattended operation. In this embodiment, the timer is of the type sold by Grenmont Controls, Inc. under the Econo Rex name.

Also mounted on the panel 16 is an output level control 28 and associated control knob. This control 28 permits the user to select the duty cycle of the UV lamp or tube in a manner to be described later. In this embodiment, the control is a twelve position switch. However, in other arrangements another multiple position rotary switch or an infinite adjustment control could be used if desired.

Also shown in FIG. 2 are rubber feet 30 which establish a standoff of the base of the enclosure 12 above a shelf or other surface on which it may be placed.

As shown in greater detail in FIGS. 3 and 4, a tunnel or light box 32 is situated within the enclosure 12. Here, the light box 32 is an elongated tube disposed at the bottom of the enclosure 12 and towards one side thereof. The light box 32 has a round opening 34 at an input end thereof and a rectangular opening 36 at the other or output end thereof. Within the light box 32 and extending for its length is an ultraviolet lamp 38, here of the cold cathode light-tube type. A fixed socket 40 and a movable socket 42 mount the lamp 38 within the box 32 and provide electrical connections to it.

An input air duct 44 is formed of a ninety-degree tubular ell. This duct 44 is of generally circular cross section and extends from the input opening grid 22 to the light box opening 44. A fan 46 is situated in the duct 44 to induce an air flow through the device 10 along the lines shown by arrows in the drawing. From the output end opening 36 to the output opening grid 24 there extends an output duct 48 which is formed of a ninety degree arcuate tubular ell. This duct 46 is of generally square or rectangular cross section.

A ballast unit 50 for the lamp 38 is situated centrally in the enclosure below the position of the handle 14. A printed circuit board 52 contains the power supply circuitry which provides pulses of power to the lamp 38. The duty cycle of the power circuit on this board 52 is controlled by the knob and output level control 28. There are many well-known circuits capable of carrying this out, and so a discussion of the circuit details is omitted. However, the setting of the knob control 28 at the desired one of its twelve possible settings adjusts the relative amount of time that the circuit board 52 presents illuminating power to the light tube lamp 38. This, in turn, corresponds to the amount of UV radiation that affects each cubic foot of air passing through the light box 32, and thereby controls the relative level of ozone that exhausts through the output grid 24.

In order to prevent ultraviolet radiation from escaping through the inlet or outlet grids 22,24, the ninety degree ell ducts 44 and 48 are constructed as arcuate bends of sufficient radius so that there is no direct line of sight from the light box 32 to the exterior of the enclosure. In other words, as illustrated by the sight lines 56 and 58 for the respective ducts 44 and 48, the line of sight that comes closest to exiting the respective ducts 42 and 44 will strike the interior of that duct. The ducts curve over a gradual arc so as to minimize the disruption of air flow. The ducts 44 and 48 are coated on their interior surfaces with a paint or other coating which prevents reflection of these particular wavelengths. Black paint is satisfactory for this. Coatings of other colors (for visible light) may also be satisfactory, provided that they do not reflect the UV wavelengths in question.

To complete the overall disclosure, FIG. 1 shows a power cord 54 installed through the input side end panel 16. A strain relief is provided at the passage through the panel 16.

As mentioned earlier, the enclosure 12 should be constructed so as to prevent condensed moisture or other possible contaminants from reaching the inside of the enclosure where damage to the printed circuit board 52 or to the UV tube 38 could occur. To that end, the outer enclosure tube 12 is preferably formed of a single piece of sheet stainless steel, and this is seamed at its bottom surface with a seam structure generally as shown in FIG. 5. Here, the seam is formed as a drip edge 60. A short flange 62 formed on one side edge abuts a longer flange 64 on the other edge. The longer flange 64 has a fin 64 bent in the direction to pass beneath the flange 62. This drip edge 60 is oriented generally as shown in FIG. 5, i.e., downward and outside of the enclosure 12. Condensation tends to form on the outside of the enclosure 12 and to drip harmlessly away, i.e., into the standoff formed by the rubber feet 30. The abutting flange structure of FIG. 5 also prevents stray UV radiation from passing through this seam to outside of the enclosure 12.

This device 10 can be used to advantage in food coolers, meat lockers, or other places where ozone may be needed without being subject to moisture or corrosion problems.

While the invention has been described in detail with respect to a single preferred embodiment, it should be understood that the invention is not limited to that precise embodiment. Rather, many modifications and variations thereof would present themselves to those of skill in the art without departing from the scope and spirit of this invention, as defined in the appended claims.

What is claimed is:

1. An ozone generating device comprising an enclosure; an input duct conducting air from the ambient into the enclosure; an output duct conducting air out of the enclosure into the ambient; a tunnel within said enclosure which has an input end connected to said input duct and an output end connected to said output duct so that an air flow is conducted through the tunnel from the input end to the output end; an ultraviolet lamp within said tunnel producing a wavelength suitable to generate ozone from oxygen in said air flow through said tunnel; and means for supplying electrical power to said lamp, including means for selectively controlling the amount of ultraviolet light generated by said lamp thus controlling the relative amount of ozone in the air delivered from the output duct, wherein said tunnel includes a straight member and said inlet and outlet ducts each include a 90-degree conduit bend precluding a direct line of sight from the respective port at the straight tunnel to the associated port on the enclosure.

2. The ozone generating device of claim 1 wherein each said 90 degree conduit bend is bent smoothly over a radius of curvature sufficient so that the bend extends over a gradual arc so as to minimize the disruption of said air flow.

3. The ozone generating device of claim 1 wherein said input duct has a generally circular cross section and said outlet duct has a generally rectangular cross section.

4. The ozone generating device of claim 1 wherein said inlet and outlet ducts are coated with a material which absorbs said ultraviolet wavelength.

5. An ozone generating device comprising an enclosure, in which said enclosure comprises a box of sheet metal with at least one seam therein, each said seam formed as a drip edge that includes mating turned-down edge flanges to induce any condensate moisture to form and drip to the outside of the enclosure; an input duct conducting air from the ambient into the enclosure; an output duct conducting air out of the enclosure into the ambient; a tunnel within said enclosure which has an input end connected to said input duct and an output end connected to said output duct so that an air flow is conducted through the tunnel from the input end to the output end; wherein said inlet and outlet ducts each include a 90 degree bend precluding a direct line of sight from the tunnel to outside the enclosure; electrically powered ozone generating means within said tunnel suitable to produce ozone from oxygen in said air flow through said tunnel; and means for supplying electrical power to said ozone generating means, including means for selectively controlling the amount of power supplied thereto thus controlling the relative amount of ozone in the air delivered from the output duct.

* * * * *